United States Patent [19]

Weaver et al.

[11] 3,770,370

[45] Nov. 6, 1973

[54] POLYAMIDE FIBERS DYED WITH A THIADIAZOLYL AZO COMPOUND

[75] Inventors: Max A. Weaver; David J. Wallace, both of Kingsport, Tenn.

[73] Assignee: Eastman Kodak Company, Rochester, N.Y.

[22] Filed: Dec. 23, 1971

[21] Appl. No.: 211,693

Related U.S. Application Data

[62] Division of Ser. No. 833,746, June 16, 1969, Pat. No. 3,657,215.

[52] U.S. Cl. .................. 8/41 B, 8/178 R, 260/158, 260/306.8 D, 260/562 R
[51] Int. Cl. ..................... D06p 3/26, C09b 29/06
[58] Field of Search ................. 8/41 B, 41 R, 178 R

[56] References Cited
FOREIGN PATENTS OR APPLICATIONS
1,503,249  10/1967  France ............................ 260/158

Primary Examiner—Donald Levy
Assistant Examiner—B. H. Hess
Attorney—Cecil D. Quillen, Jr. et al.

[57] ABSTRACT

A fiber having a basis of a linear synthetic polyamide dyed with a compound having the formula

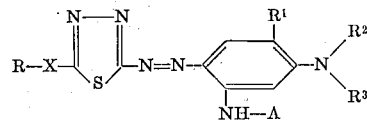

in which R is alkyl, allyl, cycloalkyl or aryl radical, X is -O- or -S-, A is acyl, $R^1$ and $R^2$ each is hydrogen or alkyl and $R^3$ is alkyl.

9 Claims, No Drawings

POLYAMIDE FIBERS DYED WITH A THIADIAZOLYL AZO COMPOUND

This is a divisional application of our Application Ser. No. 833,746 filed June 16, 1969 now U.S. Pat. No. 3,657,215, for "Thiadiazolyl Azo Compounds and Textile Materials Dyed Therewith."

This invention relates to certain novel azo compounds and, more particularly, to 1,3,4-thiadiazolylazoaniline compounds, in which the ring of the aniline coupling component is substituted with an acylamido group, and to polyamide textile materials dyed therewith.

The novel compounds of the invention have the formula

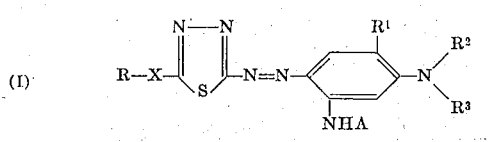

(I)

wherein

R is an alkyl, allyl, cycloalkyl or aryl radical;
X is a sulfur or oxygen atom;
A is an acyl radical;
$R^1$ is hydrogen or alkyl;
$R^2$ is hydrogen or alkyl; and
$R^3$ is alkyl, furylalkyl, thienylalkyl, or pyrrolylalkyl.

The novel azo compounds exhibit excellent dyeability properties, including affinity and build-up, when applied to polyamide fibers, yarns and fabrics according to conventional dyeing procedures. The azo compounds also exhibit excellent brightness, fastness, and migration properties on polyamide fibers. For example, the compounds of the invention possess superior fastness to light when compared to the compounds disclosed in French Pat. No. 1,503,249.

The alkyl radical which R can represent can be straight-or branch-chain, substituted or unsubstituted alkyl having from one to about 10 carbon atoms. Methyl, ethyl, propyl, isopropyl, butyl, isobutyl, amyl and hexyl are typical unsubstituted alkyl groups represented by R. Typical groups which can be present on alkyl radical R are hydroxy, e.g., 2-hydroxyethyl, 3-hydroxypropyl; halogen, e.g., 2-chloroethyl, 3-bromopropyl; lower alkoxycarbonyl, e.g., 2-ethoxycarbonylethyl, 3-methoxycarbonylpropyl; lower alkanoyloxy, e.g., 2-acetoxyethyl; lower alkoxy, e.g., 2-methoxyethyl; lower alkanoyl, e.g. 2-acetylethyl; aroyl, e.g., benzoylmethyl; cyano, e.g., 2-cyanoethyl; carbamoyl, e.g., 2-carbamoylethyl; dicarboximido, e.g., 3-succinimidopropyl; etc. As used herein to describe an alkyl moiety-containing group, "lower" designates a carbon content of up to about four carbon atoms. The alkyl radical represented by R can also be substituted with cycloalkyl, e.g. cyclopentyl, cyclohexyl, cycloheptyl, and lower alkyl-substituted derivatives thereof, and with aryl, e.g., phenyl and phenyl substituted with lower alkyl, lower alkoxy, or halogen. Cyclohexylmethyl, 2-cyclopentylethyl, 4-ethylcyclohexylmethyl, 4-methoxycyclohexylmethyl, 2-(3-chlorohexyl)ethyl, benzyl, p-methylbenzyl, 2-p-ethoxyphenyl-ethyl, 4-chlorobenzyl, 2-phenylethyl, etc. are illustrative of the cycloalkylalkyl and arylalkyl groups which R can represent. The unsubstituted alkyl radicals which R can represent preferably are lower alkyl, e.g., methyl, ethyl, propyl, and butyl, while the preferred substituted alkyl radicals contain from about two to about eight carbon atoms, e.g., 2-hydroxyethyl, benzyl, etc.

The aryl groups which R can represent preferably are monocyclic, carbocyclic aryl such as unsubstituted phenyl and phenyl substituted, for example, with lower alkyl, lower alkoxy, halogen, etc. The cycloalkyl groups represented by R include cyclopentyl, cyclohexyl, cycloheptyl and lower alkyl-substituted derivatives thereof. Specific examples of the cycloalkyl and aryl groups which R can represent appear in the preceding paragraph.

The acyl radicals represented by A can be formyl, lower alkanoyl, aroyl, cyclohexylcarbonyl, lower alkoxycarbonyl, aryloxycarbonyl, lower alkylsulfonyl, cyclohexylsulfonyl, arylsulfonyl, carbamoyl, lower alkylcarbamoyl, arylcarbamoyl, sulfamoyl, lower alkylsulfamoyl, furoyl, etc. The alkanoyl groups can be substituted with substituents such as halogen, aryl, cyano, lower alkoxy, benzyloxy, lower alkylthio, lower alkylsulfonyl, etc. The alkylsulfonyl groups also can be substituted, for example with cyano, hydroxy, halogen and the like. The alkoxycarbonyl groups can be substituted, for example, with hydroxy, alkoxy and cyano. Acetyl, propionyl, butyryl, cyanoacetyl, chloroacetyl, trifluoroacetyl, phenylacetyl, methoxyacetyl, methylthioacetyl, methylsulfonylacetyl, methoxycarbonyl, propoxycarbonyl butoxycarbonyl, methylsulfonyl, ethysulfonyl, propylsulfonyl, butylsulfonyl, 2-cyanoethylsulfonyl, 2-hydroxyethylsulfonyl, and 2-chloroethylsulfonyl, are examples of the alkanoyl, alkoxycarbonyl and alkylsulfonyl groups which A can represent. The aryl group, designated Ar, of the arylalkanoyl, aroyl, i.e., arylcarbonyl, aryloxycarbonyl, arylsulfonyl, and arylcarbamoyl groups preferably is monocyclic, carbocyclic aryl such as unsubstituted phenyl and phenyl substituted with, for example, lower alkyl, lower alkoxy, halogen, etc. Tolyl, anisyl, p-bromophenyl and o,p-dichlorophenyl are typical of such aryl groups. Dimethylcarbamoyl, ethylcarbamoyl, propylcarbamoyl, butylcarbamoyl, phenylcarbamoyl and dimethylcarbamoyl are examples of the substituted carbamoyl groups.

Examples of the alkyl groups represented by $R^1$ appear in the description relating to R. The alkyl groups represented by $R^2$ and $R^3$ can contain from one to about six carbon atoms such as, for example, methyl, ethyl, isopropyl, propyl butyl, isobutyl, 1-methylbutyl, amyl, 1,2-dimethylpropyl, 1,3-dimethylbutyl, hexyl, etc. Preferably, one of $R^1$ and $R^2$ is alkyl and the other is hydrogen. Furfuryl, 2-thienylmethyl and 2-pyrrolylmethyl are examples of the furylalkyl, thienylalkyl, and pyrrolylalkyl groups which $R^3$ can represent.

The novel azo compounds which, because of their economy and, especially, their excellent properties, are particularly valuable polyamide dyes are those of formula (I) in which R is lower alkyl, especially methyl or ethyl; X is -O- or -S-; A is lower alkanoyl, lower alkoxycarbonyl, lower alkylsulfonamido, benzamido or lower alkylcarbamoyl; $R^1$ is hydrogen or methyl; $R^2$ is hydrogen or lower alkyl; one of $R^1$ and $R^2$ is hydrogen; and $R^3$ is lower alkyl or furfuryl.

The novel azo compounds are prepared according to known procedures by diazotizing an amine having the formula

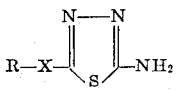

and coupling the resulting diazonium salt with a coupler having the formula

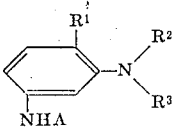

wherein R, X, A, $R^1$, $R^2$ and $R^3$ are defined above. The diazotizable aminothiadiazoles are synthesized by techniques described in the literature (Ber. 28, 946; British Pat. No. 726,045; J. Chem. Soc., 1967, 2,700–2,704). For example, 2-amino-5-mercapto-1,3,4-thiadiazole can be treated with alkylating or arylating agents, such as alkyl halides, alkyl sulfates, alkyl phosphates, aryl halides, etc., at elevated temperatures in the presence of a solvent and a base such as potassium carbonate or sodium acetate.

The couplers can be synthesized by a variety of methods. For example, an acylamidoaniline or a nitroacylanilide can be condensed with an aldehyde at elevated pressures and temperatures in the presence of a hydrogenation catalyst such as platinum to obtain the N-alkyl-m-acylamidoaniline which, if desired, can be treated with an alkylating agent to yield the N,N-dialkyl-m-acylamidoaniline coupler.

The preparation of the couplers and the novel azo compounds of the invention is further illustrated by the following examples.

EXAMPLE 1

A mixture of 3'-amino-p-acetoluidide (41.0 g.), 2-butanone (48.0 g.), ethanol (200 ml.), 5 g. Pt on C catalyst, and 1 ml. of acetic acid is hydrogenated in an autoclave at 165° C. and 1,000 psi until the hydrogen uptake ceased. The mixture from the autoclave is filtered to remove the catalyst and then most of the ethanol is evaporated. The product, 5-acetamido-N-sec-butyl-2-methylaniline, crystallizes and is collected by filtration and dried. It melts at 91°–93° C.

EXAMPLE 2

Sodium nitrite (0.72 g.) is added portionwise to 5.0 ml. of conc. $H_2SO_4$ with stirring. The solution is cooled and 10 ml of 1:5 acid (1 part propionic:5 parts acetic acid) is added below 15° C. After cooling, 2-amino-5-(ethylthio)-1,3,4-thiadiazole (1.61 g.) is added, followed by 10 ml. 1:5 acid, all below 5° C. The diazotization reaction is stirred and kept at 0°–5° C. for 2 hr. and is then added to a cooled solution of 5-acetamido-(N-sec-butyl)-2-methylaniline (2.20 g.) dissolved in 40 ml. 1:5 acid. The mixture is buffered by the addition of ammonium acetate until a test sample is neutral to Congo Red paper. After 2 hr. at below 10° C., the coupling is drowned with water and the product collected by filtration, washed with water, and dried in air. The azo compound obtained, 4-(5-ethylthio-1,3,4-thiadiazol-2-ylazo)-5-acetamido-N-sec-butyl-2-methylaniline, melts at 150°–152° C. It produces bright pink shades on polyamide fibers and has excellent light-fastness and migration properties.

EXAMPLE 3

2-Amino-5-ethylthio-1,3,4-thiadiazole (1.61 g.) is diazotized and coupled with 5-acetamido-N-isobutyl-2-methyl-aniline (2.20 g.) according to the procedure described in Example 2. The product, 4-(5-ethylthio-1,3,4-thiadiazol-2-ylazo)-5-acetamido-N-isobutyl-2-methylaniline melts at 190°–192° C. and produces bright pink shades on polyamide fibers.

EXAMPLE 4

2-Amino-5-methylthio-1,3,4-thiadiazole (1,47 g.) is diazotized and coupled with 3-acetamido-N,N-diethylaniline (2.06 g.) as described in Example 2 to yield 4-(5-methylthio-1,3,4-thiadiazol-2-ylazo)-3-acetamido-N,N-diethylaniline (m.p. 176°–178° C.) which imparts a pink shade of excellent fastness to light to polyamide fibers.

EXAMPLE 5

According to the procedure described in Example 2, 2-amino-5-methylthio-1,3,4-thiadiazole (1.47 g.) is diazotized and coupled with 5-acetamido-N-(1,3-dimethylbutyl)-2-methylaniline (2.48 g.). The product, 4-(5-methylthio-1,3,4-thiadiazol-2-ylazo)-5-acetamido-N-(1,3-dimethylbutyl)-2-methylaniline, melts at 198°–200° C. after recrystallization from methanol and produces bright pink shades on polyamide fibers.

EXAMPLE 6

2-Amino-5-ethoxy-1,3,4-thiadiazole (1.45 g.) is diazotized and coupled with 5-acetamido-N-sec-butyl-2-methylaniline (2.20 g.) as described in Example 2 to yield 4-(5-ethoxy-1,3,4-thiadiazol-2-ylazo)-5-acetamido-N-sec-butyl-2-methylaniline. It produces bright scarlet shades on nylon and exhibits excellent fastness to light.

EXAMPLE 7

2-Amino-5-ethylthio-1,3,4-thiadiazole (1.61 g.) is diazotized and coupled with 5-acetamido-N-furfuryl-2-methylaniline as described in Example 2. The azo compound obtained produces pink shades having excellent brightness and fastness properties on polyamide fibers. The azo compound has the structure:

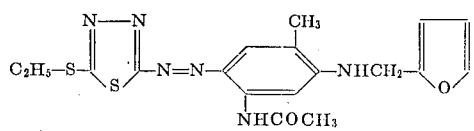

The compounds, which conform to formula I, set forth in the examples of the Table are prepared according to the procedures described in the preceding examples. The compounds of the Table in which X is a sulfur atom produce bright pink shades and those in which X is an oxygen atom produce bright scarlet shades on polyamide fibers.

TABLE

| Ex. No. | R | X | A | R¹ | R³ | R² |
|---|---|---|---|---|---|---|
| 8 | $C_2H_5-$ | S | $-COCH_3$ | $-CH_3$ | $-CH(CH_3)_2$ | H |
| 9 | $C_2H_5-$ | S | $-COCH_3$ | $-CH_3$ | $-CH(C_2H_5)_2$ | H |
| 10 | $C_2H_5-$ | S | $-COCH_3$ | $-CH_3$ | $-CH_2CH_2CH_3$ | H |
| 11 | $C_2H_5-$ | S | $-COC_2H_5$ | $-CH_3$ | $-(CH_2)_3CH_3$ | H |
| 12 | $C_2H_5-$ | O | $-COC_2H_5$ | $-CH_3$ | $-(CH_2)_3CH_3$ | H |
| 13 | $C_2H_5-$ | O | $-COC_2H_5$ | $-CH_3$ | $-CH(CH_3)CH_2CH_3$ | H |
| 14 | $C_2H_5-$ | O | $-COCH_3$ | $-CH_3$ | $-CH(CH_3)CH_2CH_3$ | H |
| 15 | $CH_3-$ | O | $-COCH_2Cl$ | $-CH_3$ | $-CH(CH_3)CH_2CH_3$ | H |
| 16 | $CH_3-$ | S | $-COCH_2Cl$ | $-CH_3$ | $-CH(CH_3)CH_2CH_3$ | H |
| 17 | $CH_3-$ | S | $-CONHC_2H_5$ | $-CH_3$ | $-CH(CH_3)CH_2CH_3$ | H |
| 18 | $CH_3-$ | S | $-SO_2CH_3$ | $-CH_3$ | $-CH(CH_3)CH_2CH_3$ | H |
| 19 | $CH_3-$ | S | $-COC_6H_5$ | $-CH_3$ | $-CH(CH_3)CH_2CH_3$ | H |
| 20 | $CH_3-$ | S | $-COC_6H_{11}$ | $-CH_3$ | $-CH(CH_3)CH_2CH_3$ | H |
| 21 | $CH_3CH_2CH_2-$ | S | $-COCH_2CN$ | $-CH_3$ | $-CH(CH_3)CH_2CH_3$ | H |
| 22 | $CH_3CH_2CH_2-$ | S | $-COC_6H_4\text{-}p\text{-}OCH_3$ | $-CH_3$ | $-CH(CH_3)CH_2CH_3$ | H |
| 23 | $C_2H_5-$ | S | $-COCH_3$ | $-CH_3$ | $-C_2H_5$ | $-C_2H_5$ |
| 24 | $C_2H_5-$ | O | $-COCH_3$ | H | $-C_2H_5$ | $-C_2H_5$ |
| 25 | $C_2H_5-$ | S | $-COOC_2H_5$ | H | $-C_2H_5$ | $-C_2H_5$ |
| 26 | $C_2H_5-$ | S | $-COC_6H_5$ | H | $-C_2H_5$ | $-C_2H_5$ |
| 27 | $C_2H_5-$ | S | $-COCH_3$ | H | $-CH(CH_3)CH_2CH_3$ | $-C_2H_5$ |
| 28 | $C_2H_5-$ | S | $-COCH_2OCH_3$ | H | $-CH_2CH(CH_3)_2$ | $-CH_2CH_2CH_3$ |
| 29 | $C_2H_5-$ | S | $-COCH_3$ | H | $-CH(CH_3)CH_2CH(CH_3)_2$ | $-CH_3$ |
| 30 | $C_2H_5-$ | S | $-COCH_3$ | H | $-CH(CH_3)CH(CH_3)_2$ | $-C_2H_5$ |
| 31 | $(CH_3)_2CHCH_2-$ | S | $-COCH_3$ | H | $-C_2H_5$ | $-C_2H_5$ |
| 32 | $C_6H_{11}-$ | S | $-COCH_3$ | H | $-C_2H_5$ | $-C_2H_5$ |
| 33 | $C_6H_{11}-$ | S | $-COCH_3$ | $-CH_3$ | $-CH(CH_3)CH_2CH_3$ | H |
| 34 | $C_6H_{11}-$ | S | $-COCH(CH_3)_2$ | $-CH_3$ | $-CH(CH_3)CH_2CH_3$ | H |
| 35 | $C_6H_{11}-$ | S | $-COCH_2C_6H_5$ | $-CH_3$ | $-CH(CH_3)CH_2CH_3$ | H |
| 36 | $C_6H_5CH_2-$ | S | $-COCH_3$ | $-CH_3$ | $-CH(CH_3)CH_2CH_3$ | H |
| 37 | $C_6H_5CH_2-$ | S | $-COCH_3$ | H | $-C_2H_5$ | $-C_2H_5$ |
| 38 | $C_6H_5CH_2-$ | S | $-COCH_3$ | $-CH_3$ | $-CH_2CH(CH_3)_2$ | H |
| 39 | $C_6H_5CH_2-$ | S | $-COCH_3$ | $-CH_3$ | $-CH_2\overset{\underset{\mid}{C_2H_5}}{CH}(CH_2)_3CH_3$ | H |
| 40 | $C_6H_5CH_2CH_2-$ | S | $-COCH_3$ | $-CH_3$ | $-CH_2\overset{\underset{\mid}{C_2H_5}}{CH}(CH_2)_3CH_3$ | H |
| 41 | $C_6H_5CH_2-$ | O | $-COCH_3$ | $-CH_3$ | $-CH(CH_3)CH_2CH_3$ | H |
| 42 | $C_6H_5CH_2-$ | O | $-COCH_3$ | H | $-C_2H_5$ | $-C_2H_5$ |
| 43 | $C_6H_5-$ | S | $-COCH_3$ | $-CH_3$ | $-CH(CH_3)CH_2CH_3$ | H |
| 44 | $HOCH_2CH_2-$ | S | $-COCH_3$ | $-CH_3$ | $-CH(CH_3)CH_2CH_3$ | H |
| 45 | $ClCH_2CH_2-$ | S | $-COCH_3$ | $-CH_3$ | $-CH(CH_3)CH_2CH_3$ | H |
| 46 | $NCCH_2CH_2-$ | S | $-COCH_3$ | $-CH_3$ | $-CH(CH_3)CH_2CH_3$ | H |
| 47 | $CH_3OCH_2CH_2-$ | S | $-COCH_3$ | $-CH_3$ | $-CH(CH_3)CH_2CH_3$ | H |
| 48 | $\overline{COCH_2CH_2CONCH_2CH_2-}$ | S | $-COCH_3$ | $-CH_3$ | $-CH(CH_3)CH_2CH_3$ | H |
| 49 | $CH_3OOCCH_2CH_2-$ | S | $-COCH_3$ | $-CH_3$ | $-CH(CH_3)CH_2CH_3$ | H |
| 50 | $CH_3COCH_2CH_2-$ | S | $-COCH_3$ | $-CH_3$ | $-CH(CH_3)CH_2CH_3$ | H |
| 51 | $C_6H_{11}CH_2-$ | S | $-COCH_3$ | $-CH_3$ | $-CH(CH_3)CH_2CH_3$ | H |
| 52 | $C_6H_{11}-$ | O | $-COCH_3$ | $-CH_3$ | $-CH(CH_3)CH_2CH_3$ | H |
| 53 | $p\text{-}CH_3C_6H_{10}-$ | O | $-COCH_3$ | $-CH_3$ | $-CH(CH_3)CH_2CH_3$ | H |
| 54 | $CH_3-$ | S | $-COCH_3$ | $-CH_3$ | $-CH_2\overset{\frown}{C}=CH-CH=CH-O$ | H |
| 55 | $CH_3-$ | S | $-COOC_2H_5$ | $-CH_3$ | $-CH_2\overset{\frown}{C}=CH-CH=CH-O$ | H |
| 56 | $CH_3-$ | S | $-COOCH_3$ | $-CH_3$ | $-CH_2\overset{\frown}{C}=CH-CH=CH-O$ | H |
| 57 | $C_2H_5-$ | O | $-COCH_3$ | $-CH_3$ | $-CH_2\overset{\frown}{C}=CH-CH=CH-O$ | H |
| 58 | $C_2H_5-$ | S | $-COCH_3$ | $-CH_3$ | $-CH_2\overset{\frown}{C}=CHCH=CHS$ | H |
| 59 | $C_2H_5-$ | S | $-COCH_3$ | $-CH_3$ | $-CH_2\overset{\frown}{C}=CHCH=CHNH$ | H |
| 60 | $C_2H_5-$ | S | $-COCH_3$ | H | $-CH(CH_3)CH_2CH_3$ | H |
| 61 | $C_2H_5-$ | S | $-COCH_3$ | H | $-CH_2CH(CH_3)_2$ | H |
| 62 | $CH_2=CHCH_2-$ | S | $-COCH_3$ | $-CH_3$ | $-CH_2CH(CH_3)_2$ | H |
| 63 | 3,3,5-tri-$CH_3$-cyclohexyl | S | $-COCH_3$ | $-CH_3$ | $-CH_2CH(CH_3)_2$ | H |

The novel azo compounds can be applied to polyamide textile materials according to known disperse dyeing techniques. Various dispersing and wetting agents can be employed in the dispersion of the finely divided dye compound in an essentially aqueous dyebath. Procedures by which the compounds of the invention can be applied to polyamide textile materials are described in U.S. Pat. Nos. 3,100,134 and 3,320,021. The following example illustrates a method for applying the novel compounds to polyamide fibers.

EXAMPLE 64

The azo compound (50.0 mg.) of Example 3 is dispersed in 5 cc. of 2-methoxyethanol. A small amount (3-5 cc.) of a 3% sodium lignin sulfonate solution is added, with stirring, and then the volume of the bath is brought to 150 cc. with water. A 5 g. textile fabric made of nylon 66 fibers is placed in the bath which is then slowly brought to the boil. The dyeing is carried out at the boil for 1 hr. with occasional stirring. The dyed fabric is then removed from the dyebath, rinsed with water, and dried in an oven at 250° F. The fabric is dyed a bright shade of pink exhibiting excellent fastness properties when tested in accordance with the procedures described in the Technical Manual of the American Association of Textile Chemists and Colorists, 1968 edition.

The polyamide materials which can be dyed with the novel azo compounds are well-known and include nylon 66 (polyhexamethylene adipamide) manufactured by the polymerization of adipic acid and hexamethylenediamine, nylon 6 (polycaprolactam) prepared from epsilon-aminocaproic acid lactam (caprolactam), and nylon 8. A detailed description of the synthetic polyamide materials which are dyed bright fast shades by the compounds of the invention is set forth in U.S. Pat. No. 3,100,134. Although the compounds of the invention are especially suitable for dyeing polyamide textile materials, they also produce bright shades of pink or scarlet on other hydrophobic textile materials such as cellulose acetate and polyester fibers.

The invention has been described in detail with particular reference to preferred embodiments thereof, but it will be understood that variations and modifications can be effected within the spirit and scope of the invention.

We claim:

1. A fiber having a basis of a linear synthetic polyamide dyed with a compound having the formula $$R-X-\underset{S}{\underset{\|}{\overset{N-N}{\diagup}}}-N=N-\underset{NH-A}{\overset{R^1}{\diagdown}}\underset{}{\diagdown}N\underset{R^3}{\overset{R^2}{\diagdown}}$$

wherein

R is lower alkyl; lower alkyl substituted with succinimido, cyclohexyl, or lower alkylcyclohexyl; allyl; cyclohexyl; or lower alkylcyclohexyl;

X is -S- or -O-;

A is lower alkanoyl; lower alkanoyl substituted with chlorine, bromine, aryl, cyano, lower alkoxy, benzyloxy, lower alkylthio, or lower alkylsulfonyl; lower alkylsulfonyl; lower alkoxycarbonyl; cyclohexylcarbonyl; aroyl; carbamoyl; or lower alkylcarbamoyl; each aryl group being phenyl or phenyl substituted with lower alkyl, lower alkoxy, chlorine or bromine;

$R^1$ and $R^2$ each is hydrogen or lower alkyl, one of $R^1$ and $R^2$ being hydrogen; and $R^3$ is alkyl, furylalkyl, thienylalkyl or pyrrolylalkyl containing from one to six carbon atoms.

2. A fiber according to claim 1 wherein the polyamide is poly(hexamethylene adipamide) or poly(caprolactam).

3. A fiber according to claim 2 wherein the fiber is dyed with a compound having the formula $$R-X-\underset{S}{\underset{\|}{\overset{N-N}{\diagup}}}-N=N-\underset{NH-A}{\diagdown}\underset{}{\diagdown}N\underset{R^3}{\overset{R^2}{\diagdown}}$$

wherein

R is lower alkyl;

X is -O- or -S-;

A is lower alkanoyl;

$R^1$ is hydrogen or, when $R^2$ is hydrogen, $R^1$ is methyl;

$R^2$ is hydrogen or lower alkyl; and $R^3$ is lower alkyl or furfuryl.

4. A fiber according to claim 2 wherein the fiber is dyed with a compound having the formula $$C_2H_5S-\underset{S}{\underset{\|}{\overset{N-N}{\diagup}}}-N=N-\underset{NHCOCH_3}{\diagdown}\underset{CH_3}{\overset{CH_3}{\diagdown}}-NHCHCH_2CH_3$$

5. A fiber according to claim 2 wherein the fiber is dyed with a compound having the formula $$C_2H_5S-\underset{S}{\underset{\|}{\overset{N-N}{\diagup}}}-N=N-\underset{NHCOCH_3}{\diagdown}\underset{}{\overset{CH_3}{\diagdown}}-NHCH_2CH(CH_3)_2$$

6. A fiber according to claim 2 wherein the fiber is dyed with a compound having the formula $$CH_3S-\underset{S}{\underset{\|}{\overset{N-N}{\diagup}}}-N=N-\underset{NHCOCH_3}{\diagdown}-N\underset{C_2H_5}{\overset{C_2H_5}{\diagdown}}$$

7. A fiber according to claim 2 wherein the fiber is dyed with a compound having the formula $$CH_3S-\underset{S}{\underset{\|}{\overset{N-N}{\diagup}}}-N=N-\underset{NHCOCH_3}{\diagdown}\underset{CH_3}{\overset{CH_3}{\diagdown}}-NHCHCH_2CHCH_3$$

8. A fiber according to claim 2 wherein the fiber is dyed with a compound having the formula $$C_2H_5O-\underset{S}{\underset{\|}{\overset{N-N}{\diagup}}}-N=N-\underset{NHCOCH_3}{\diagdown}\underset{CH_3}{\overset{CH_3}{\diagdown}}-NH-CHCH_2CH_3$$

9. A fiber according to claim 2 wherein the fiber is dyed with a compound having the formula $$C_2H_5S-\underset{S}{\underset{\|}{\overset{N-N}{\diagup}}}-N=N-\underset{NHCOCH_3}{\diagdown}\underset{}{\overset{CH_3}{\diagdown}}-NHCH_2-\underset{O}{\diagdown}$$

* * * * *

PO-1050
(5/69)

UNITED STATES PATENT OFFICE
CERTIFICATE OF CORRECTION

Patent No. __3,770,370__ Dated __November 6, 1973__

Inventor(s) __Max A. Weaver and David J. Wallace__

It is certified that error appears in the above-identified patent and that said Letters Patent are hereby corrected as shown below:

Column 3, line 24, delete "Ber. 28," and insert therefor ---Ber. $\underline{28}$,---.

Column 4, line 19, delete "(1,47 g.)" and insert therefor ---(1.47 g.)---.

Column 5, in the Table, Example 62, under the heading "R", delete "$CH_2$-$CHCH_2$-" and insert therefor ---$CH_2$=$CHCH_2$- ---.

Signed and sealed this 10th day of September 1974.

(SEAL)
Attest:

McCOY M. GIBSON, JR.
Attesting Officer

C. MARSHALL DANN
Commissioner of Patents